US006433789B1

(12) United States Patent
Rosman

(10) Patent No.: US 6,433,789 B1
(45) Date of Patent: Aug. 13, 2002

(54) STEAMING PREFETCHING TEXTURE CACHE FOR LEVEL OF DETAIL MAPS IN A 3D-GRAPHICS ENGINE

(75) Inventor: Andrew Rosman, Palo Alto, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/507,393

(22) Filed: Feb. 18, 2000

(51) Int. Cl.$^7$ ............................................. G06T 11/00
(52) U.S. Cl. ........................................................ 345/582
(58) Field of Search ............................. 345/419, 428, 345/552, 568, 581, 582, 587

(56) References Cited

U.S. PATENT DOCUMENTS

| | | | |
|---|---|---|---|
| 5,831,640 A | 11/1998 | Wang et al. | 345/521 |
| 5,844,576 A | 12/1998 | Wilde et al. | 345/525 |
| 5,880,737 A | 3/1999 | Griffin et al. | 345/430 |
| 5,886,706 A | 3/1999 | Alcorn et al. | 345/430 |
| 5,945,997 A * | 8/1999 | Zhoa et al. | 345/581 |
| 5,946,003 A | 8/1999 | Zakharia | 345/501 |
| 5,987,567 A | 11/1999 | Rivard et al. | 711/118 |
| 5,990,902 A | 11/1999 | Park | 345/430 |
| 6,002,407 A | 12/1999 | Fadden | 345/430 |
| 6,002,410 A | 12/1999 | Battle | 345/513 |
| 6,011,565 A | 1/2000 | Kuo et al. | 345/513 |
| 6,288,730 B1 * | 8/2001 | Duluk, Jr. et al. | 345/552 |

* cited by examiner

*Primary Examiner*—Almis R. Jankus

(57) ABSTRACT

Disclosed is a texture prefetching method for use in a three-dimensional graphics display system in which texture maps of an object are stored in memory for texels at (u,v) memory locations. The method of fetching texels for use in calculating (x,y) display pixel values comprises the steps of: a) identifying in (u,v) space a geometric shape to be displayed in (x,y) space, b) establishing tiles of pixels within the geometric shape for use in accessing texels, c) computing texel addresses at one side of a tile based on current addresses (topuc, topvc) and first and second derivatives of (u,v) as a function of (x) and a first derivative as a function of (y), d) computing texel addresses at an opposing side of the tile based on current addresses (u0,v0) and first and second derivatives of (u,v) as a function of (x) and a first derivative as a function of (y), and e) fetching texel blocks within the tiles as defined by the addresses in steps c) and d). In a preferred embodiment, the geometric shape is a triangle, and a tile comprises a quadrilateral having top and bottom pixel locations for two opposing sides, and step c) and step d) define corners of the quadrilateral in (u,v) space.

48 Claims, 14 Drawing Sheets

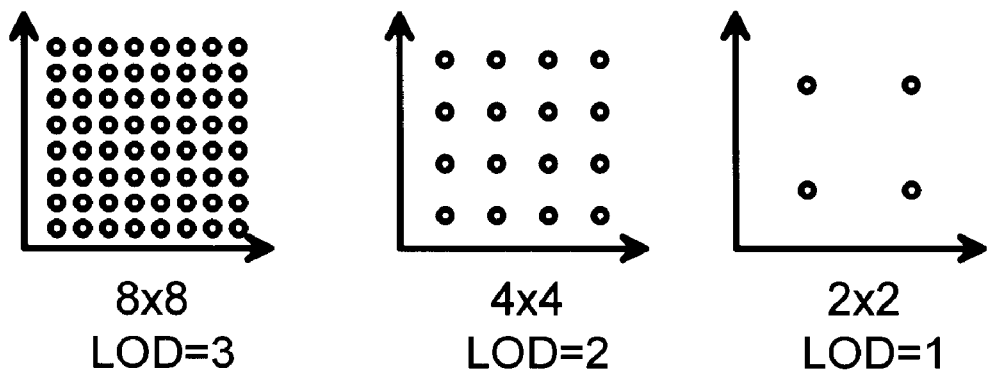
FIG. 1
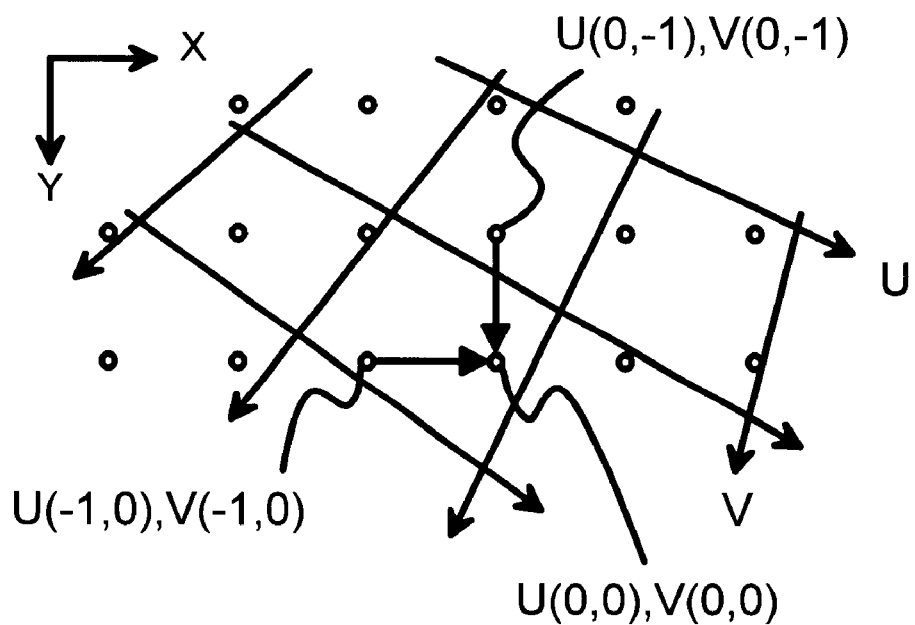
FIG. 2   o PIXELS

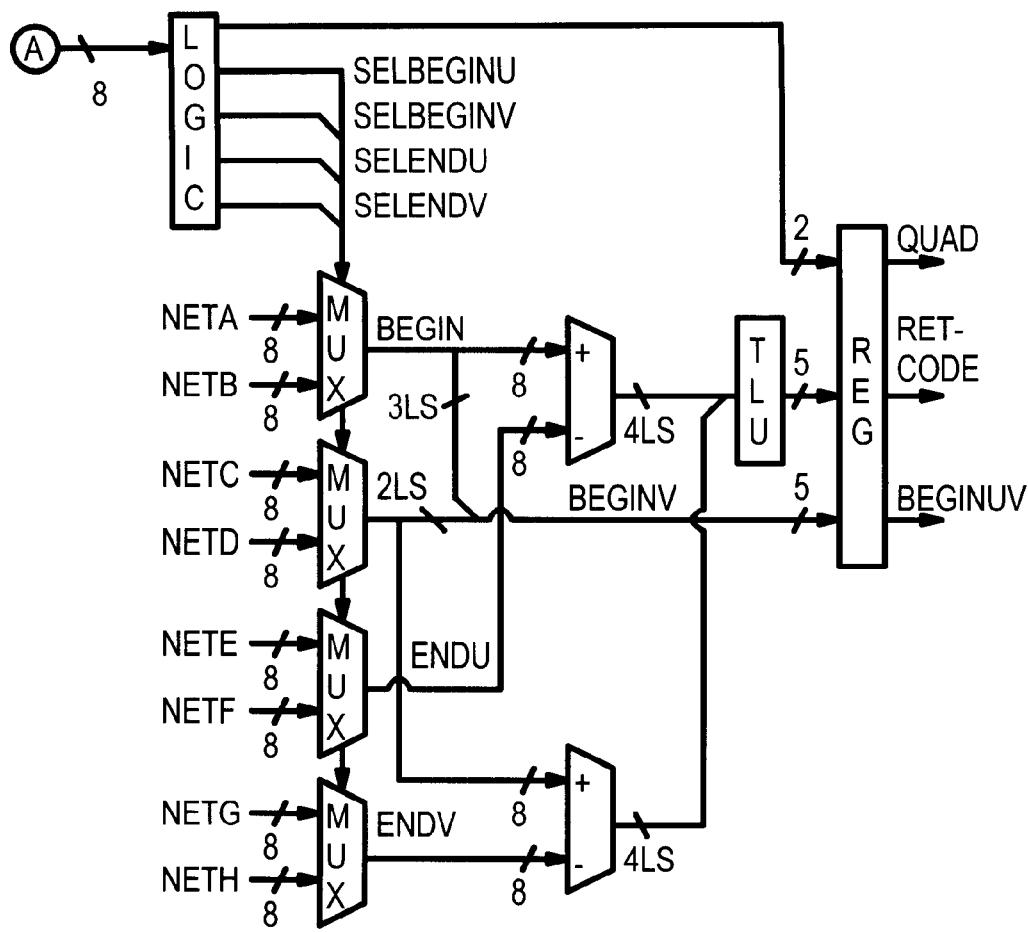
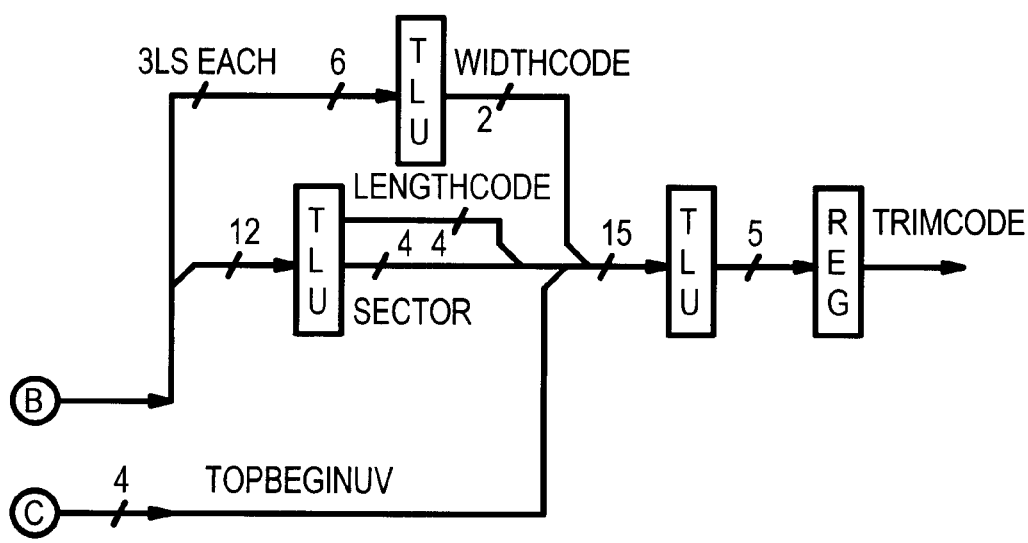
FIG. 10B

| TRIM CODE | UPPER RIGHT | LOWER LEFT |
|---|---|---|
| 0 | 0 | 0 |
| 1 | 1 | 0 |
| 2 | 0 | 1 |
| 3 | 1 | 1 |
| 4 | 2 | 1 |
| 5 | 1 | 2 |
| 6 | 2 | 2 |
| 7 | 3F | 1 |
| 8 | 3F | 2 |
| 9 | 1 | 3F |
| A | 2 | 3F |
| B | 3F | 3F |
| C | 3C | 3C |
| D | 5C | 3C |
| E | 3C | 5C |
| F | OTHER | OTHER |
| 10-1F | ' | ' |

UPPER RIGHT - 4H

LOWER LEFT - 3C

PATTERN CODE:

0 - NONE
1 - IN THE CORNER
2H - 2 HORIZONTAL
2V - 2 VERTICAL
3C - 3 IN THE CORNER (SEE FIG)
3H - 3 HORIZONTAL
3V - 3 VERTICAL
4H - 3 HORIZONTAL + 1 (SEE FIG)
4V - 3 VERTICAL + 1
5H - 3 HORIZONTAL + 2
5V - 3 VERTICAL + 2

STEAMING PREFETCHING TEXTURE CACHE FOR LEVEL OF DETAIL MAPS IN A 3D-GRAPHICS ENGINE

FIELD OF THE INVENTION

This invention relates generally to 3D graphics systems, and more particularly the invention relates to texture maps and the prefetching of texture map texels for use in generating pixels for display of a three-dimensional object.

BACKGROUND OF THE INVENTION

Graphics systems for portable personal computers (PC's) have advanced rapidly. Three-dimensional (3D) objects can be rendered for more realistic appearances. Arbitrarily complex textures can be applied to surfaces in correct perspective.

The texture of an object is stored in texture maps of varying levels of detail (LOD). Object surfaces closer to the user are shown in more detail by using a texture map with a high LOD, while far-away surfaces are shown with little texture detail by using a texture map with a coarser LOD. The texture elements (texels) in the texture map are used to modify or modulate pixels in a triangular display in order to add surface material type or environmental conditions effects. The displayed three-dimensional object comprises a plurality of interlocking triangles.

FIG. 1 shows texture maps with three different levels of detail. Note, LOD maps may vary from 1×1 texels to 1K×1K or more texels. The LOD=3 map is an 8×8 texture map with 8 rows of 8 texels; a total of 64 texels. This level of detail is used for surfaces at a certain distance to the viewer. The LOD=2 map has only 4×4 or 16 texels. Each texel in the 4×4 map may be generated by averaging together four pixels in the 8×8 map. Other methods for mip-map generation may be employed.

The coarser LOD map is a 2×2 map with only four texels. The LOD=1 map may be generated from the LOD=2 map by averaging together groups of four pixels in the 8×8 map for each texel in the 2×2 map. The LOD=1 map is used for more distant object surfaces that show little surface-texture detail.

When the displayed triangle is parallel to the viewer so that most pixels are the same distance (depth) from the viewer, the texels on a single LOD map may be applied directly to the pixels from a single LOD map. However, most triangles are at an angle to the viewer so that some pixels on the triangle are at a greater distance from the viewer than others. A perspective correction is required if unpleasant artifacts are to be avoided.

The u,v coordinate values for the stored texels as calculated may not be exact integer values. A pixel may fall between texels on the texture map. Then the texture value for the pixel may be calculated, or reconstructed, by a distance-weighted average of the four closest texels to the exact u,v coordinate. This is known as bi-linear interpolation since interpolation is performed in the two dimensions of a single LOD texture map. Other more effective, though more expensive, methods of texture map reconstruction may be employed.

The LOD map selected depends on the rate of change or derivative of the u,v coordinate. Triangles at high or glancing angles to the viewer have many u,v, points per screen pixel (x and y values) and thus have high derivatives or orders of change for u,v with respect to some x,y direction. The largest derivatives may be used to determine the LOD map to select for a pixel within a triangle. More effective, though more expensive, methods for LOD computation, such as anisotropic filtering, may be employed.

The texture maps may be stored in a dynamic-random-access memory (DRAM) such as the system memory or video buffer. However, texel access may be slower than desired for higher-performance 3D pipelines. The texel data may be rearranged within the DRAM by memory management software, such as described by Saunders in U.S. Pat. No. 5,871,197. However, the slow DRAM speed remains.

Hardware caches of texture maps may be necessary for highest performance. See Migdal et al., U.S. Pat. No. 5,760,783, and the background of Chimito, U.S. Pat. No. 5,550,961. These texture caches provide faster retrieval of texels than that from the frame buffer DRAM.

While such hardware texture caches are effective, hit rates are less than desired unless very large cache sizes are used. Caching texels is useful when the same texel is used again. However, new texels require lengthy miss processing to fetch them from the slower DRAM memory. On the other hand, the 3D pipeline needs to operate at the full clock rate in order to maximize performance. Prefetching is desirable, but it is not always apparent which texels to prefetch.

Since the texture caches are accessed by u,v texture-space addresses rather than x,y screen coordinates, a perspective correction of 1/w must be applied for each pixel to generate the u,v coordinates. This correction is not known until late in the pipeline. As triangles are rendered, pixels are rasterized for one span at a time. It is not immediately apparent how u,v changes as x,y changes for pixels within a triangle. Further, the level of detail may change as pixels in a span are being rendered, requiring a different LOD texture map to be loaded into the texture cache. Thus, determining how to prefetch texels is problematic.

What is desired is a 3D graphics system that prefetches texels into a texture cache. An intelligent prefetching mechanism for a texture cache is desired. It is desired to cache some but not all texture map texels in a higher-speed cache memory before or while a triangle is being rendered. It is desired to minimize texture-cache misses by prefetching texels that will soon be needed by the triangle pixel-rendering pipeline. It is further desired to minimize the bandwidth required for retrieving texels from DRAM. A minimum size texture cache with an organization optimized for a high-speed pixel pipeline is desired.

Heretofore, a 3D graphics system has been demonstrated that prefetches texels into a texture cache. Some but not all texture maps are cached in a higher-speed cache memory while a triangle is being rendered. Texture-cache misses are minimized by prefetching texels that will soon be needed by the triangle pixel rendering pipeline. The prefetching mechanism is not random. Prefetching occurs along a vector in the u,v, texture space for texels in a span. The u,v space is corrected in perspective from the x,y pixel space. While the magnitude of u,v changes varies within a span of pixels in a triangle, the direction of changes is constant along a span. The vector in the u,v, texture space is generated with the u,v coordinates of the first two pixels in a span. This vector points in the direction of further texels in the span. Blocks of texels are prefetched in this direction and not in other directions. Thus, although exact u,v information is not known in advance, the vector limits the possibilities for prefetching.

It has been realized that texture map data is ill-suited for linear address memory organization. Consequently, each texture map may be organized on 2-level hierarchical tiling. At the lowest hierarchy level, a map is sub-divided into blocks. Blocks represent the lowest level of texture organization of concern to the cache management. Each block is 4×4 texels in size. Although the texture maps differ in size as the LOD changes, the blocks are a constant 4×4 texels in size. Higher resolution LOD maps have more blocks than coarser LOD maps. Cache updating and management is simplified by the use of small, square blocks of texels that may closely match a triangle's area. Because texture and pixel coordinates are statistically unrelated or unaligned to each other, only square blocks offer direction-independent retrieval of texel data for screen aligned pixels.

At the highest hierarchy level, blocks are arranged in tiles. A tile is a square array of blocks, such that one tile is contained within a page of DRAM. For example, 8×8 blocks, where a block is 4×4 16-bit texels, are contained within one 16K-bit DRAM page. This tile arrangement ensures direction-independent DRAM retrieval of blocks of texels with minimum page misses. This, in turn, maximizes the bandwidth utilization of DRAM access. Further, in a 4-bank DRAM organization, tiles may be 4-way interleaved (2-way in u and 2-way in v) allowing the hiding of RAS (Row Access) cycles during the other bank's CAS (column access) cycles—thus approaching the bandwidth of SRAM devices.

It is further realized that while the magnitude of u,v changes varies within a span of pixels in a triangle, the direction of changes is constant along a span or any line contained within the surface. A vector in the u,v texture space can be generated with the u,v coordinates of the first two pixels in a span. This vector then points in the direction of further texels in the span. Blocks of texels can be prefetched in this direction and not in other directions. Thus, although exact u,v information is not known in advance, the vector limits the possibilities for prefetching. In a similar fashion, a vector along the dominant edge, derived from the first pixels of the first two spans, may facilitate the prefetching of blocks while advancing from span to span.

When fixed-size blocks are combined with u,v-vector prefetching, the texture cache can store and update blocks prefetched along the direction of the u,v vectors. The cache and prefetching logic are simplified.

The prefetch mechanism is best tailored for DRAM burst accessing by means of prefetching a number of blocks at once. For example, assume the DRAM is organized as 256-bit columns within 16K-bit rows (pages). Then, 16 new pixels—of 16 bpp (bits per pixel) type—along the span may require 4 blocks of texels or a burst of 4 column access cycles. A page miss may occur in about 1 of 5 cases. In order to mitigate the overhead associated with page misses, blocks within a map may be 4-way interleaved in u and v across 4 DRAM banks so as to allow the overlapping of new RAS cycles with current CAS (column access) cycles. This scheme may result in DRAM access approaching that of SRAM access.

The block prefetch mechanism accesses many more texels than required by a single span of pixels. The square blocks, in fact, pertain to 4 or more spans of pixels. Therefore, along longer spans, the extra texels pertaining to the other 3 spans is never used because the cache must be updated along the span as the storage capacity is depleted. This results in higher than necessary bandwidth demand.

An additional drawback arises from the use of only the direction of the u,v vector. The magnitude of the vector may change sufficiently to cause either insufficient or too much texel data to be prefetched. This has the effect of reducing the effective bandwidth available from the DRAM.

SUMMARY OF THE INVENTION

The present invention is directed to an improved prefetch mechanism including an algorithm for accessing u,v texel values in the stored texture maps based on updating texture blocks of texels for pixel tiles by using a current texel (u,v) address and calculated rates of change in (u,v) values with respect to changes in (x,y) pixel locations.

More particularly, in a three-dimensional graphics display system in which texture maps of an object are stored in memory for texels at (u,v) memory locations, the invention is a method of fetching texels for use in calculating (x,y) display pixel values comprising the steps of: a) identifying in (u,v) space a geometric shape to be displayed in (x,y) space, b) establishing tiles of pixels within the geometric shape for use in accessing texels, c) computing texel addresses at one side of a tile based on current addresses (topuc, topvc) and first and second derivatives of (u,v) as a function of (x) and a first derivative as a function of (y), d) computing texel addresses at an opposing side of the tile based on current addresses (u0,v0) and first and second derivatives of (u,v,) as a function of (x) and a first derivative as a function of (y), and e) fetching texel blocks within the tiles as defined by the addresses in steps c) and d).

In a preferred embodiment, the geometric shape is a triangle, a tile comprises a quadrilateral having top and bottom pixel locations for two opposing sides, and step c) and step d) define corners of the quadrilateral in (u,v) space.

The invention and objects and features thereof will be more readily apparent from the following detailed description and appended claims when taken with he drawings.

BRIEF DESCRIPTION OF THE DRAWINGS

FIG. 1 illustrates texture maps with three different levels of detail.

FIG. 2 illustrates the partial derivations of u and v texture coordinates with respect to x an y at each pixel as employed in the present invention.

DETAILED DESCRIPTION OF THE ILLUSTRATIVE EMBODIMENTS

In practicing the present invention in accordance with a preferred embodiment, the (u,v) texture maps are accessed in blocks (e.g. four-by-four texels) from DRAM memory in order to develop pixel values for triangular areas of a three-dimensional object. In accessing texels from the texture maps, (u,v) addresses and previous changes in (u,v) addresses, or (u,v) deltas, are supplied along with other texel parameters and a Level of Detail (LOD).

Level-of-Detail (LOD) computation for texture requires the partial derivatives of u and v texture coordinates with respect to x and y at each pixel. The actual—direction independent—derivatives then may be computed from their projections on the x and y axis. The largest of these is then selected as representing the direction in which the pixel projects onto the most number of texels. This ensures the selection of the smallest texel size that completely circumscribes the current pixel. In turn, this avoids undersampling and its aliasing consequences.

The u and v derivatives may be computed by first taking the differences, or delta's, between successive pixel values of u and v in both x and y as illustrated in FIG. 2. The delta values may be computed from the current (0,0) and the previous pixels' (u,v) addresses:

$$\text{Delta}Ux = u(0,0) - u(-1,0)$$

$$\text{Delta}Uy = u(0,0) - u(0,-1)$$

$$\text{Delta}Vx = v(0,0) - v(-1,0)$$

$$\text{Delta}Vy = v(0,0) - v(0,-1)$$

Figure 3:
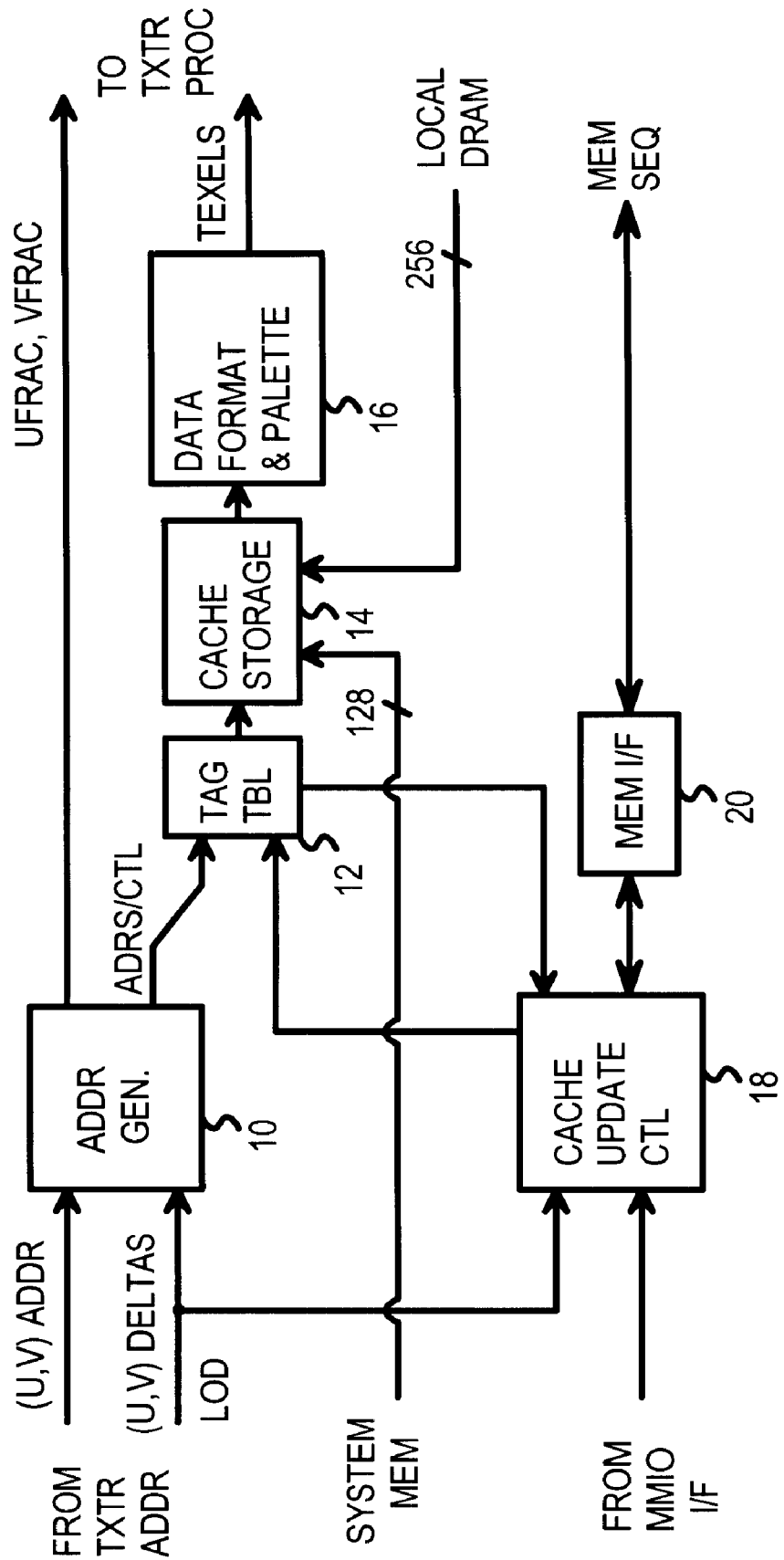
FIG. 3 is a functional block diagram of a texture cache for use in the present invention.

FIG. 3 illustrates a Texture Cache subsystem which incorporates both cache address logic as well as the cache itself and in which the present invention can be implemented. The (u,v) address and (u,v) deltas (derivatives) from the previous texture addresses are applied to Address Generation unit 10. The delta values represent the first derivatives and may be computed by taking the instantaneous differences between current and previous pixels' u and v addresses along the x and y axis.

Texture address generation unit 10 provides UFRAC, VFRAC to a texture processor, and address generation unit 10 applies a control signal to tag table 12 which maintains a table of texel block addresses in cache storage 14. For those texel block addresses which are not in cache storage, system memory is accessed for retrieving newly addressed texels. Cache storage provides texel values to Data Format and Palette unit 16 with the formatted texels then applied to the texture processor. Tag table 12 communicates with cache update control 18 for controlling any update in cache storage 14. Cache update control 18 also receives inputs from the memory management I/O and communicates with a memory sequencer through memory I/F unit 20. Texture address and tag table are described further herein.

As noted above and as used in the illustrative embodiment, texture maps are organized in a 2-level hierarchical tiling. At the lowest hierarchy level, a map is sub-divided into blocks. Blocks represent the lowest level of texture organization of concern to the cache management. Each block is 4×4 texels in size. In 16 bpp modes, one block is contained within one column of DRAM. Although the texture maps differ in size as the LOD changes, the blocks are a constant 4×4 texels in size. Higher-resolution LOD maps have more blocks than coarser LOD maps. Cache updating and management is simplified by the use of small, square blocks of texels that may closely match a triangle's area. Because texture and pixel coordinates are statistically unrelated or unaligned to each other, only square blocks offer direction-independent retrieval of texel data for screen aligned pixels.

At the highest hierarchy level, blocks are arranged in tiles. A tile is a (near) square array of blocks, such that one tile is contained within a page (2 KB) of DRAM. In 16 bpp modes, there are 8×8 blocks in each tile. This tile arrangement ensures direction-independent DRAM retrieval of blocks of texels with minimum page misses. Additionally, it is desirable to interleave the tiles in odd/even fashion along both u and v. This requires a 4-bank DRAM organization; this results in hiding all but few row access and pre-charge cycles.

Figure 4:
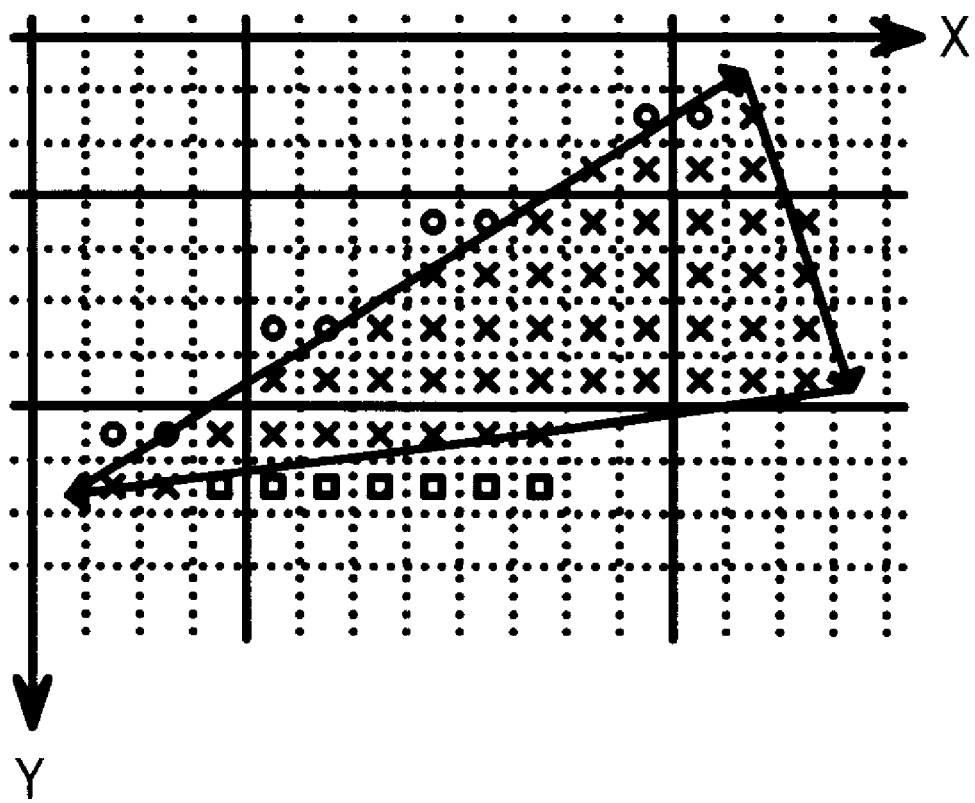
FIG. 4 is a plot illustrating tile processing in accordance with one embodiment of the invention.

The present embodiment rasterizes pixels within triangles in 'tiled' order rather than completing an entire triangle span. The tile size corresponds to 4 spans by 8 pixels—screen coordinate aligned. This ensures that most of the prefetched texture block data is used by the engine. Likewise, the ZEngine and PixelEngine buffers are more efficiently used. A tile-processing example is depicted in FIG. 4.

Assuming top-to-bottom rendering, the processing sequence is:

Tile0: top middle—2 pixels
Tile1: top right—4 pixels
Tile2: center middle—26 pixels
Tile3: center right—12 pixels
Tile4: lower left—6 pixels
Tile5: lower middle—14 pixels Cache size and prefetch rate requirements. Assume as a typical example, that the pixel rate in the pipeline is 2 pixels per clock, where the pixel pairs are in adjacent spans at the same column location. Each clock cycle, at least 8 texels—for bilinear interpolation—must be read from the cache, although often not all texels are unique. In addition to reading texels, we have to allocate write cycles for the updating of the cache. Because of the prefetching nature of the texture updating, the latency of the writes should be minimized. Ideally, the write bandwidth should be matched to the peak read bandwidth of the Video Memory, which is 256 bits every clock cycle.

The size of the cache may be specified on a basis of cost/performance criteria. In the current implementation, the pixel processing proceeds along tiles of up to 32 pixels—4 spans by 8 pixels per span as shown in FIG. 4. A tile of 32 pixels may be processed in at most 16 clocks if 2 pixels are processed per clock. Because the cache may be updated from a shared DRAM—shared with render and z buffers—16 clocks would generally be insufficient time for prefetching. Prefetching for 2 tiles at a time would allow for at least 32 clock cycles—a better choice.

This is a good match for this embodiment. The analysis of the memory access requirements follows. In a sustained operating mode, every 32 clocks a texture prefetch as well as z and pixel reads and writes are required. The z and render buffers are also tiled and the respective engines are equipped with buffers accommodating 8 blocks each, where a block is 256 bits, representing a 4×4 pixel block in 16-bit per pixel mode. Therefore, the z and pixel engines may access 8 blocks or 128 pixels at a time. This translates into 2 accesses of 8 blocks each during each 32 clocks. Because the memory bus is 256 bits, a block represents a column access (CAS) which is possible every clock. In summary, 3 accesses are required every 32 blocks. Two accesses are of 8 CAS cycles each and the third, texture access, as shown later, averages 10 CAS cycles. After including the RAS overhead for the 3 accesses, the DRAM access is well matched for the processing requirements such that there is no need to extend the size and cost of the buffers. The RAS overhead and page break penalty may be additionally minimized by a 4-way interleaved DRAM organization of 4 banks.

Figure 5A:
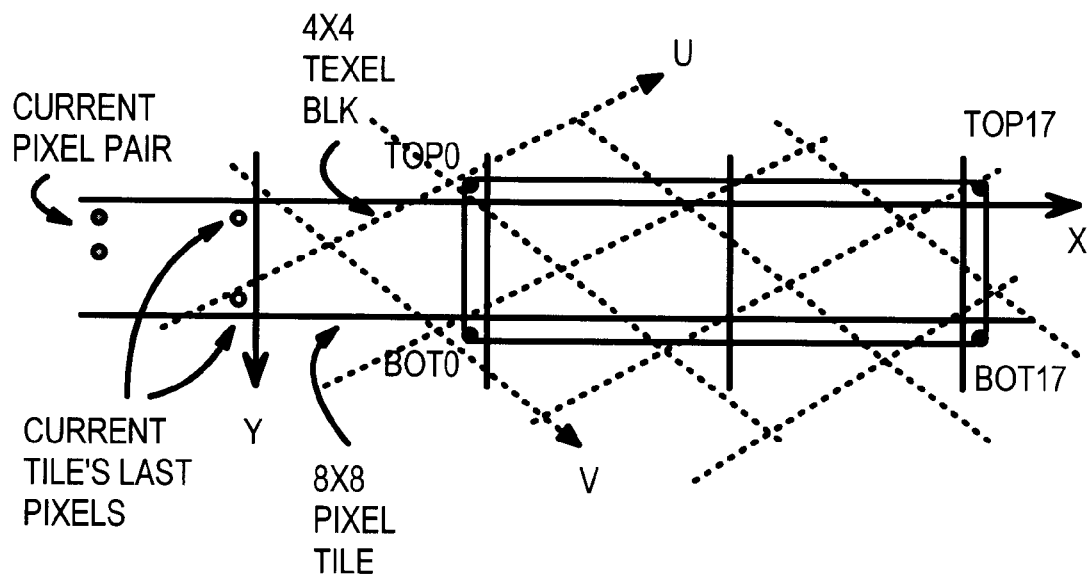
FIGS. 5a, 5b illustrate implementation of a prefetch algorithm based on updating texture blocks for two pixel-tiles with a look-ahead of two tiles in accordance with an embodiment of the invention.
Figure 5B:
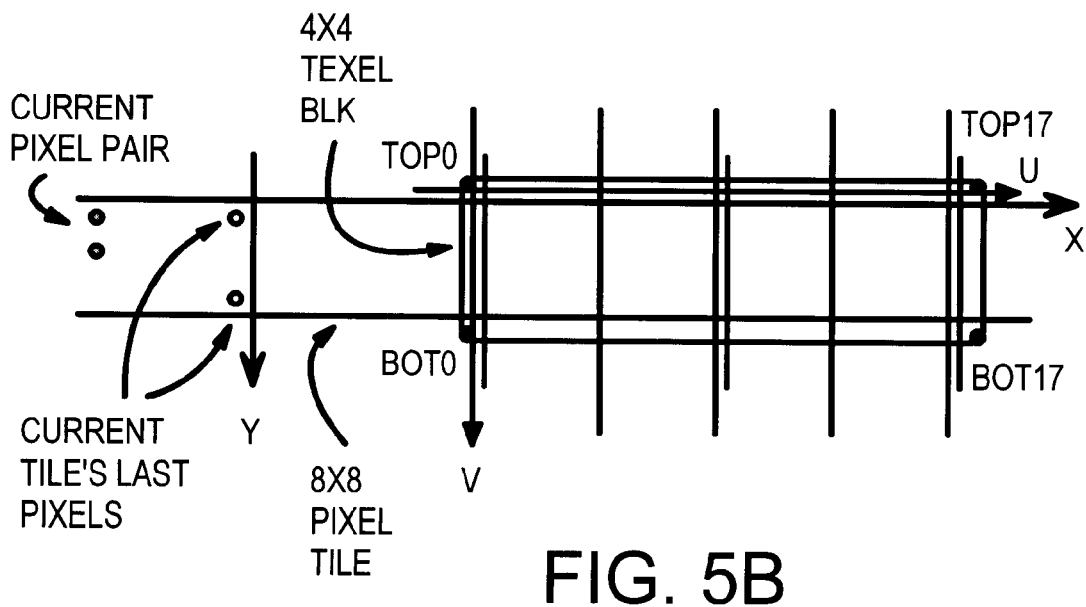

The previous description establishes cache size requirements—mainly prefetching enough texture for two pixel tiles. It may be shown that at most 18 texture blocks are required for each pixel tile pair as long as no super-sampling is employed—see the figures below. The average number required is actually about 10 blocks. Because the prefetch for the next 2 pixel tiles is concurrent with processing of the current pixel tiles, the minimum texture cache size requirement is 32 blocks or 1024 bytes in 16-bit per texel mode. In such cases when 18 blocks are required, the next prefetch only requires 12 additional blocks-as can be seen in FIG. 5B below. Compressed textures may require less; however, they may not be considered exclusively because many applications use uncompressed textures. In tri-linear modes, an additional 8 blocks may be required. However, considering the adaptive tri-linear scheme employed in the invention, the 1K byte cache size is sufficient.

Prefetch algorithm and implementation. The prefetch algorithm is based on updating texture blocks for 2 pixel tiles with a look-ahead of 2 tiles. FIGS. 5A, 5B may be used to illustrate the scheme.

Figure 6:
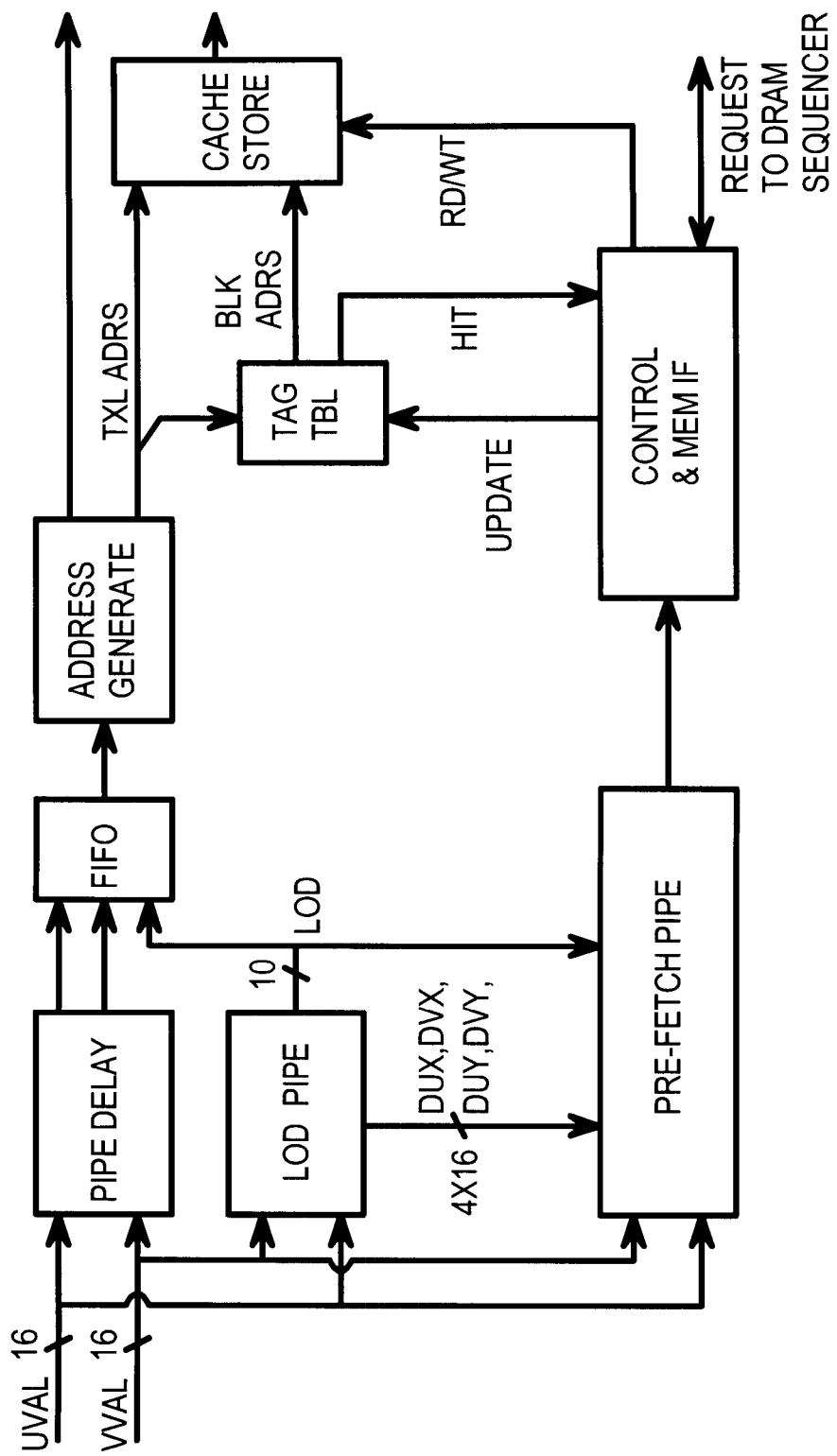
FIG. 6 is a block diagram of logic for computing block addresses of pixel tiles based on current pixel pair (u,v) coordinates in accordance with an embodiment of the invention.

The current pixel pair (u,v) coordinates serve to compute the block addresses 2–3 pixel tiles ahead. In essence, the delta u and v addresses as well as their second derivatives are used to calculate the relative addresses of the bounding box corners, as shown in FIG. 6.

The LOD Pipe 30 computes the actual derivatives at every pixel from the delta (u,v) addresses. The pipeline latency is 6 clocks. The derivatives are supplied to the PreFetch Pipe 32 after the first clock. The second derivatives are also computed. The main objective is to optimize the scheme for long spans because these dominate the performance equation. An approach for efficiently transitioning for span to span is also included along with a triangle start scheme and Level-Of-Detail transitioning.

The algorithm along the x-direction is described first. The intent is to find all texture blocks inside the bounding box surrounding the 2-pixel-tile area in FIGS. 5A, 5B. This box has to extend just outside the tiles so as to ensure that neighbor texels are available for bilinear interpolation. The first step is to compute the pixel coordinates of the left side of the 2-pixel-tile bounding box. These (topu0, topv0) and (botu0, botv0) addresses may be computed from the current addresses (topuc, topvc), (botuc, botvc) as well as the first (topduy, topdvy, botduy, botdvy), (topdux, topdvx, botdux, botdvx) and second (topdux2, topdvx2, botdux2, botdvx2) derivatives:

$topu0 = topuc - 120*topdux + 66*topdux2 + topduy;$ $topv0 = topvc - 120*topdvx + 66*topdvx2 + topdvy;$ $botu0 = botuc - 120*botdux + 66*botdux2 + botduy;$ $botv0 = botvc - 120*botdvx + 66*botdvx2 + botdvy;$ The behavior of u or v along the x-axis may be closely approximated by a second order function, such as for $u(x) = a*x^2 + b*x + c$ Given three u values along the x-axis—u0, u1 and u2—we can solve for the 3 coefficients (a, b and c), as a function of u0, dux and dux2, where dux=u1−u0 and dux2=u2−u0:

$2a = -2*dux + dux2$ $2b = 4*dux - dux2$ $c = u0$

Figure 7:
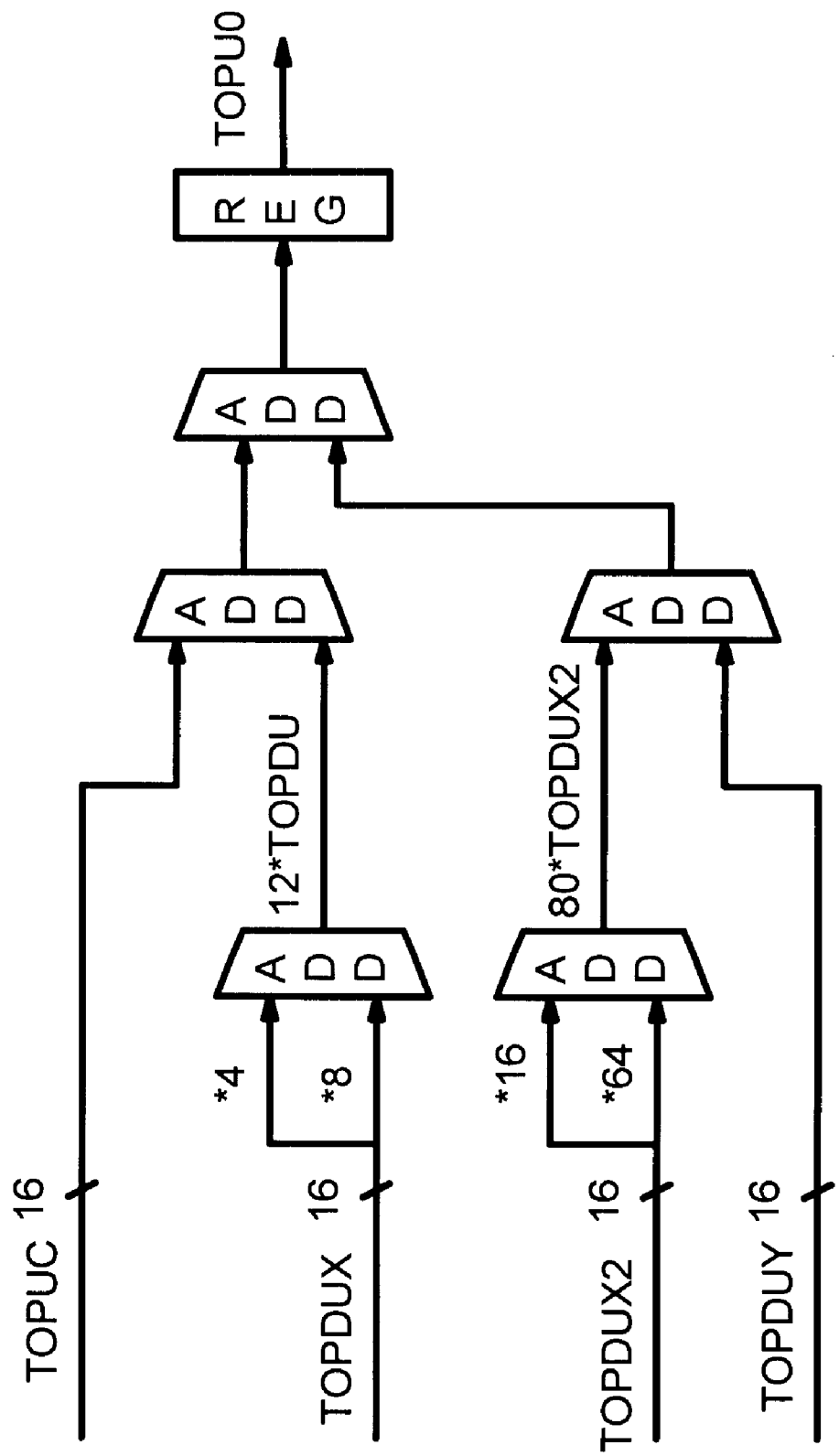
FIG. 7 is a logic diagram for computing pixel coordinates of the left side of a two-pixel tile bounding box.

Then, solving for u12, the value of the u-function at x=12, $u12 = 12^2*a + 12*b + c$ $u12 = -120*dux + 66*dux2 + u0$ FIG. 7 illustrates the logic circuitry hardware for implementing the above algorithms. The computational hardware may consist of 4 identical circuits—one pair each for the top u and v as well as bottom u and v. Each can be accomplished within the same clock cycle using five 16-bit adders, as shown in FIG. 7 for topu0.

Figure 8:
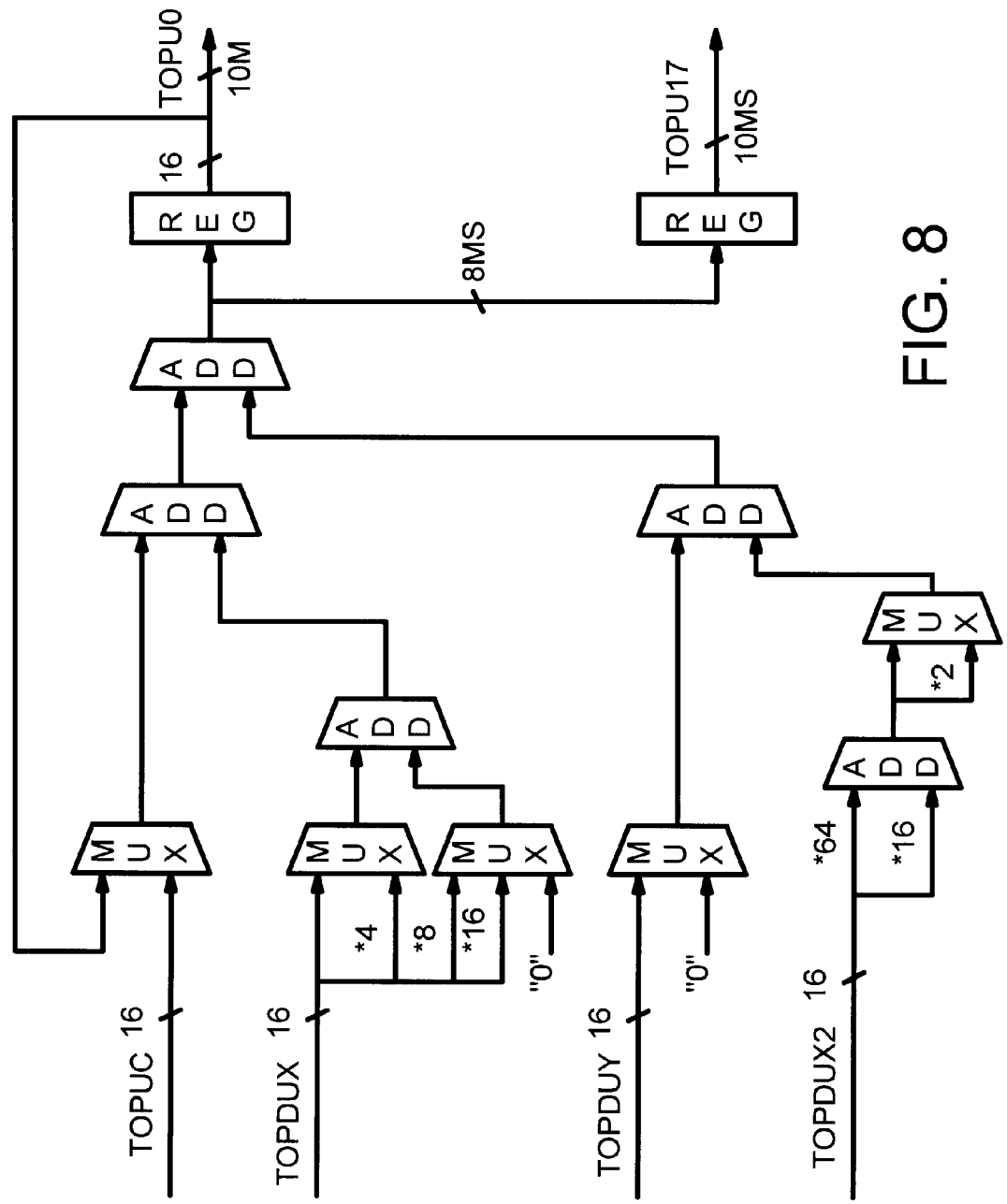
FIG. 8 is a logic diagram for computing the address of the farthest pixel to the right of the two-pixel tile bounding box.

During the second clock cycle, the address of the farthest pixel to the right—17 pixels away—shown as Top17 (utop17,vtop17) and Bot 17 (ubot17,vbot17), may be computed in the same hardware, by the same means—that is, by solving the second order function at x=17:

$topu17 = u0 - 255*topdux + 136*topdux2;$ $topv17 = v0 - 255*topdvx + 136*topdvs2;$ $botu17 = u0 - 255*botdux + 136*botdux2;$ $botv17 = v0 - 255*botdvx + 136*botdvx2;$ The circuit for the 2 cycles finally may look as shown in FIG. 8 for Topu values.

Figure 9:
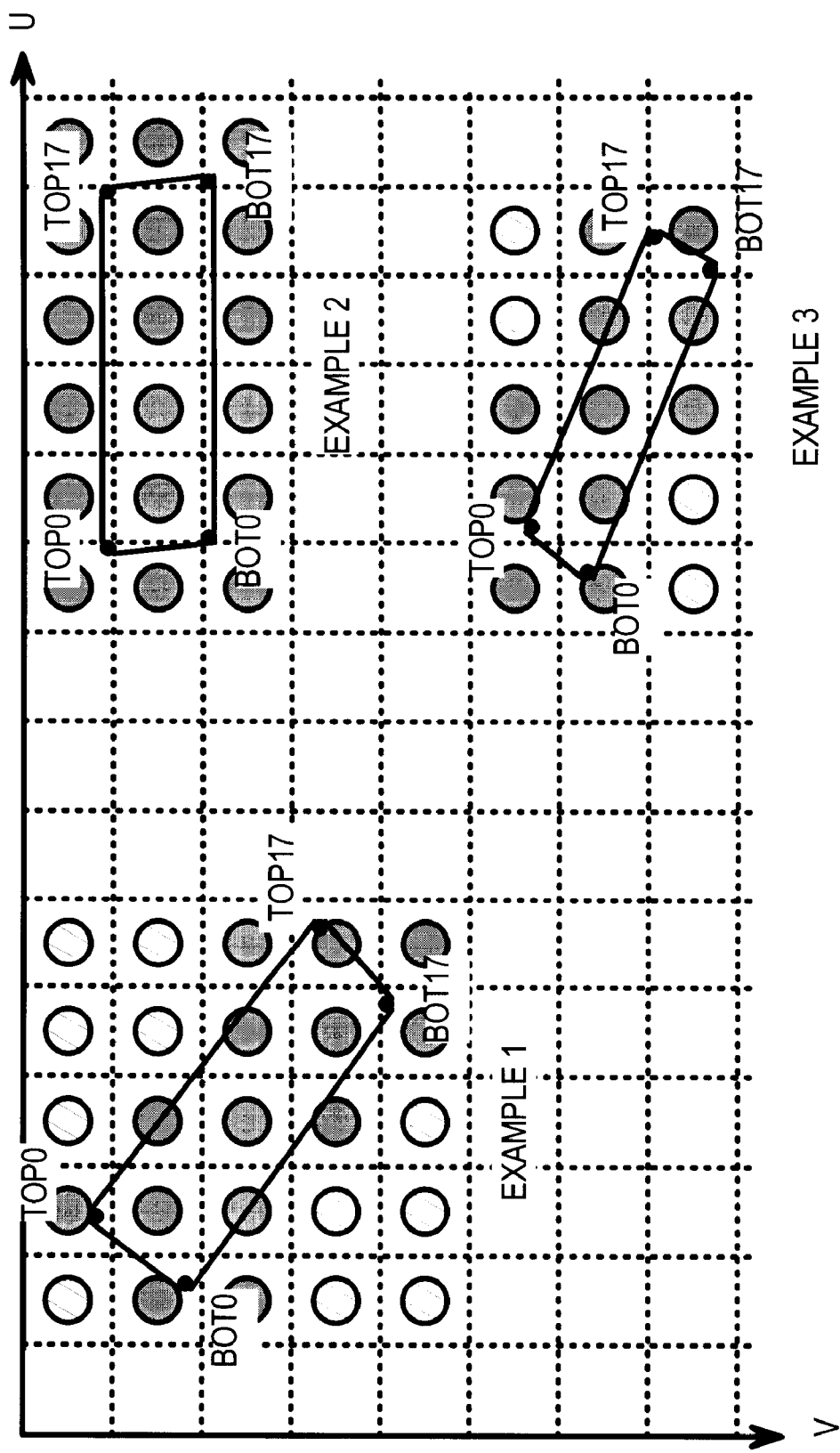
FIG. 9 is a graph illustrating three different bounding boxes in (u,v,) space.

While there may be some number of solutions for finding just the blocks within the bounding box, the present algorithm is intended to limit the latency of computation while finding a reasonably accurate solution. In particular, it is worth noting, that the above computed bounding box may be described by a rectangle in u, v-space, as shown in FIG. 9 for 3 examples. The examples are assuming that the LOD has already been accounted for and that only LODs 5 through 10 are pertinent for prefetching because the lower resolution maps may be entirely pre-loaded into the cache. In other words, prefetching will be turned off for these lower resolution LODs.

In the simplest of implementations, the entire rectangle may be fetched. While this would yield a short latency and minimal hardware, it would often fetch more blocks than required and would thus increase the maximum number of blocks to be fetched. Therefore, it is worthwhile finding those blocks not within the bounding box. This process of trimming the rectangle is a function of primarily the orientation of the bounding box as well as its beginning location, length and width. In Example 1 of FIG. 9, at near 40% orientation to the u-axis, the pattern of blocks that may be trimmed is evident as being 3 blocks along the u-axis and 2 blocks along the v-axis. At orientations along either axis, no trimming is necessary.

Figure 10:
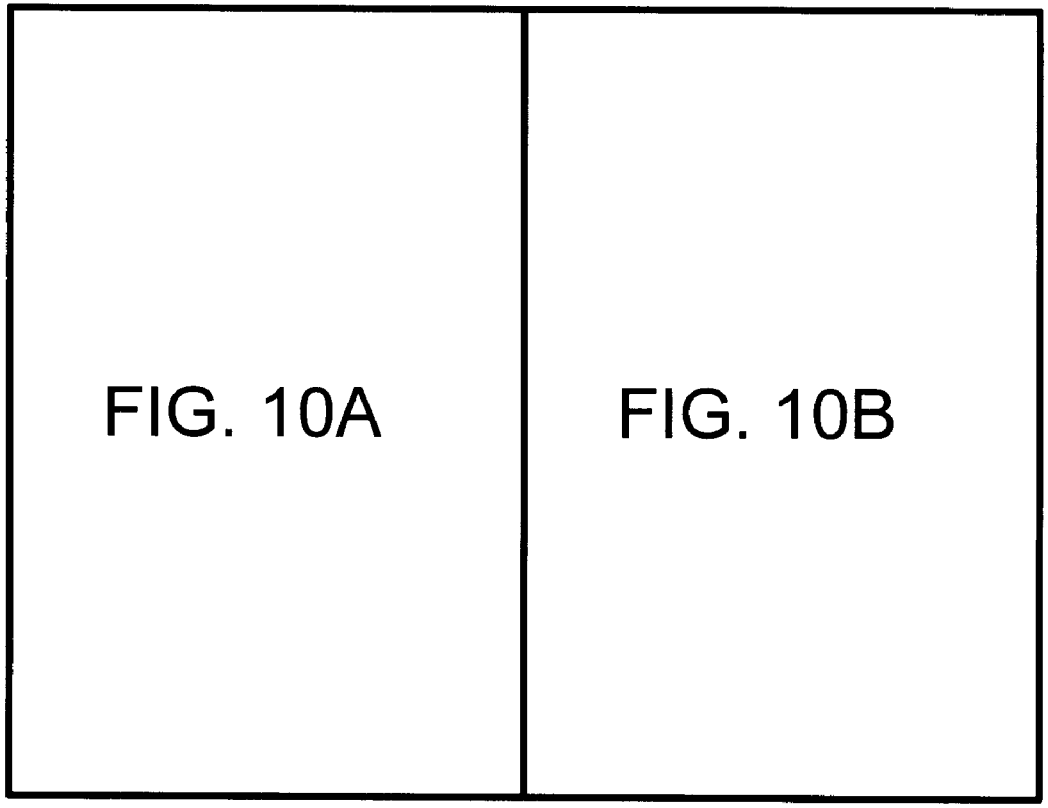
FIG. 10 illustrates logic circuitry for deriving rectangle coordinates as well as a trimming code for a bounding box.
Figure 10A:
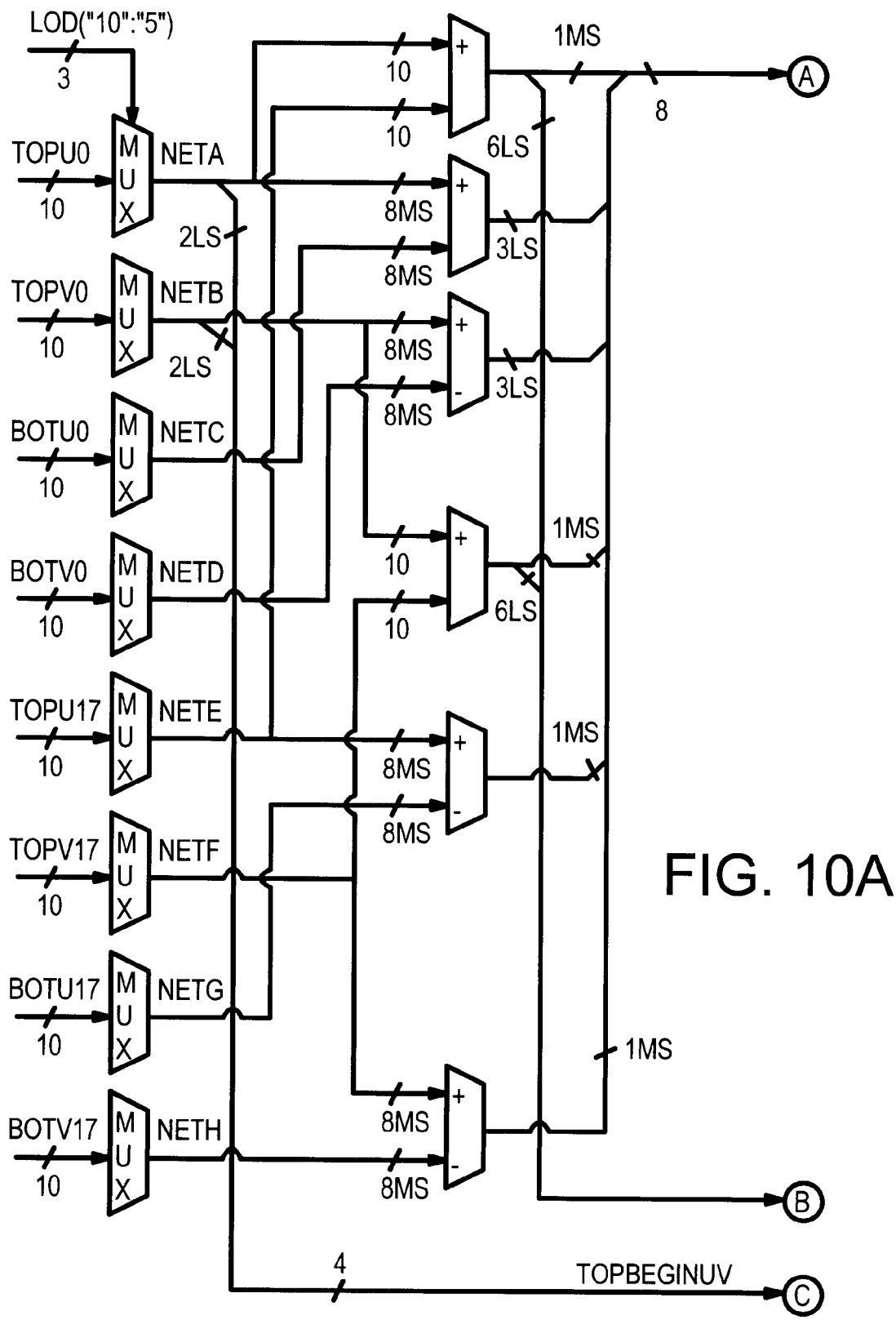

During the 3rd prefetch clock cycle, the rectangle coordinates are derived as well as the trimming code, using the logic circuitry of FIG. 10.

This implementation makes frequent use of Table Look-Up function or TLUs. In most cases, the function within a particular TLU is a sparse table, with many common terms—allowing for reasonably small, synthesized combinatorial logic. For example, the widthcode and lengthcode functions represent quantized values of the SQRT($u^2+v^2$) along the length (0.5 to 4.2 blocks) and width (0.2 to 1.2 blocks) of the bounding box. The sector is likewise a quantized value representing one of eight sectors between 0 and 90°. The quad variable identifies the quadrant within which the sector resides. Symmetry among quadrants shall be used to only compute the result for 90°.

The rectangle code or Rectcode TLU 40 encodes the pertinent rectangle ratio in 4 bits and includes a fifth bit indicating whether the major axis is along u or v. The 4-bit represents the following:

0—6:1
1—6:2
2—6:3
3—6:4
4—5:1
5—5:2
6—5:3
7—5:4
8—5:5
9—4:1
A—4:2
B—4:3
C—4:4
D—3:1, 2:1
E—3:2
F—3:3

Sector TLU 42 assumes the positive quadrant (0–90°) since the quadrant is input separately into the final equation. The sector may be encoded in 16 equal increments of 5.625 degrees.

Figure 11:
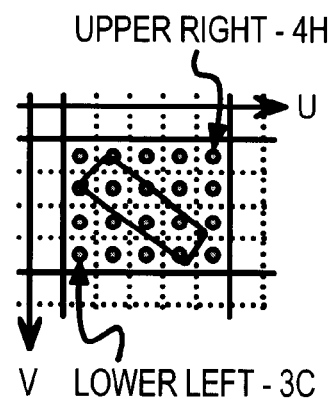
FIG. 11 is a table and bounding box illustration with the table contents derived mathematically by recreating the actual bounding box within the constraints of the resolution of input variables.

Trimcode TLU 44 encodes 32 patterns of blocks to be excluded. The table contents may be derived mathematically by recreating the actual bounding box within the constraints of the resolutions of the input variables consideration of its length along the x-axis. Again, the patterns are referenced to the $0^{th}$ quadrant. The 32 combinations, some of interest shown in the table of FIG. 11, may be derived algorithmically by mapping all possible combinations to the 32 eliminating the maximum number of blocks.

Figure 12:
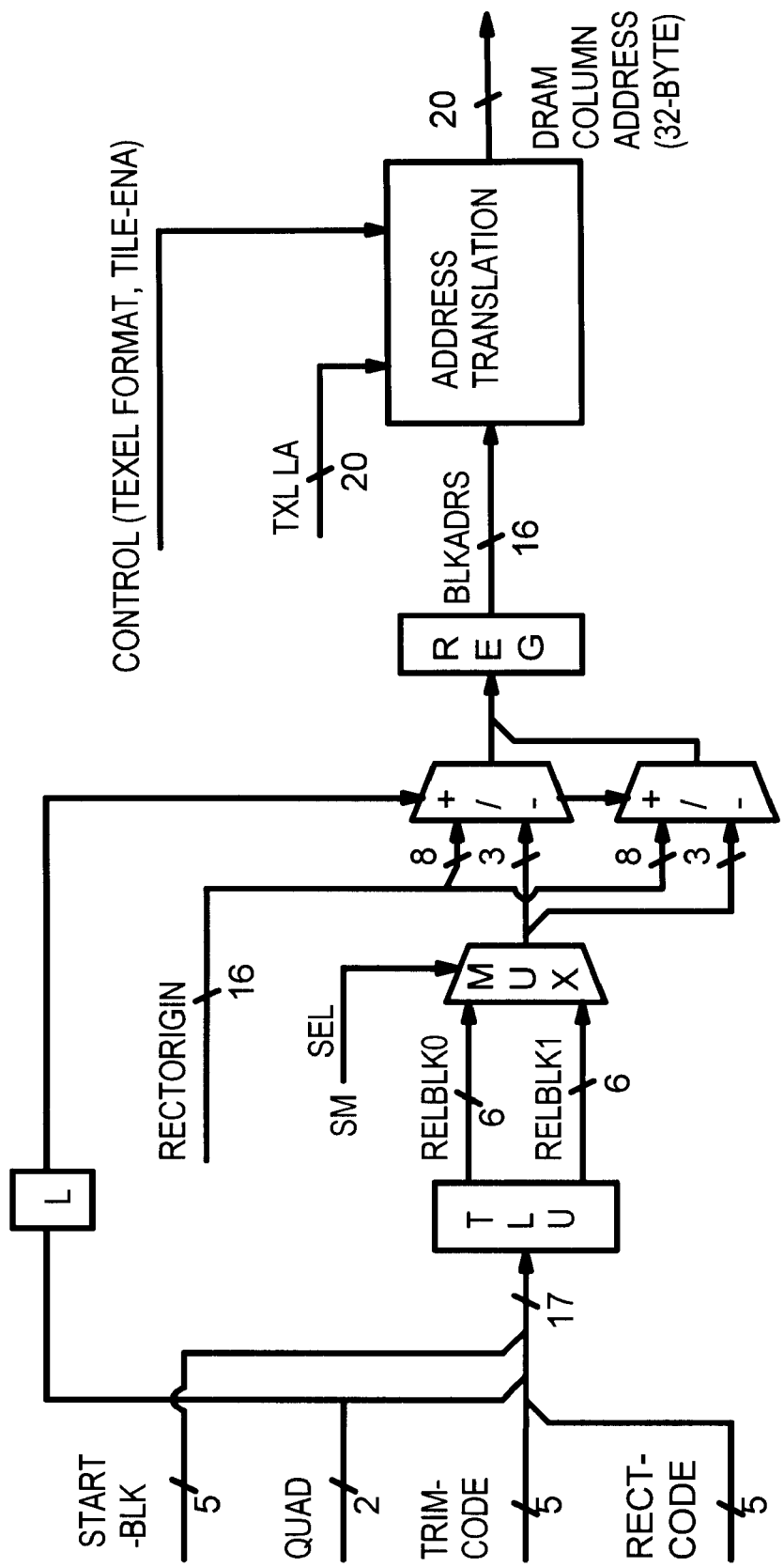
FIG. 12 is a functional block diagram illustrating the next stage in computing outputs for use as a table entry to a table lookup unit (TLU).

During the next stage shown in FIG. 12 the previous stage outputs are used as a table entry to another TLU 50. This function generates relative block addresses, in page order, for all the blocks within the bounding box. The control, shown as SM, subsequently sequences through all the valid TLU entries. The block address is then translated to a physical DRAM memory address, keeping in mind that blocks are stored in tile order.

Note, the register stage 46, 48 in FIG. 10 between FIG. 10 and FIG. 12 need not exist. The state machine controlling this entire prefetch pipe may regard these stages as a single 2-cycle stage; this allows more propagation time through the logic.

Span-to-span prefetch optimization. At the end of each span and beginning of the next span, two optimizations are desired. First, as the rendering approaches the end of the span, it is desirable to omit the blocks beyond the end of the span. Second, it is desirable to prefetch the next span blocks while rendering the last tiles of the current span.

Detecting the end of the span is rather straightforward because a Span Controller updates this information along the span. The Span Controller updates all pixel pipeline stages, including the Texture Cache, with tile control information. Part of this data is the remaining pixel count for the worst case span of the 4 spans in the tile. This data may consist of the 3-bit RemainBlocks variable expressing the number of blocks remaining and the one-bit flag RemBlkGT7 indicating that the RemainBlocks value is larger than 7 blocks. Based on this, the prefetch mechanism may effectively 'cut-off' any blocks beyond the end of the span by effecting the n and m constants in the equations for Top17 (utop17, vtop17) and Bot17 (ubot17,vbot17) as follows:

$$tipu17 = u0 - n*topdux + m*topdux2;$$

$$topv17 = v0 - n*topdvx + m*topdvx2;$$

$$botu17 = u0 - n*botdux + m*botdux2;$$

$$botv17 = v0 - n*botdvx + m*botdvx2;$$

where
n=5, 45, 117 or 255 and
m=10, 36, 78 or 136 depending on whether 1, 2, 3 or 4 blocks remain in the span.

The second optimization pertains to prefetching the beginning blocks of the next span while rendering the last tile of the current span. Again RemBlkGT7 and RemainBlocks serve to indicate when the prefetch should switch from 'along the same span' to 'along the dominant edge and next span', as may be observed in FIG. 13.

Figure 13:
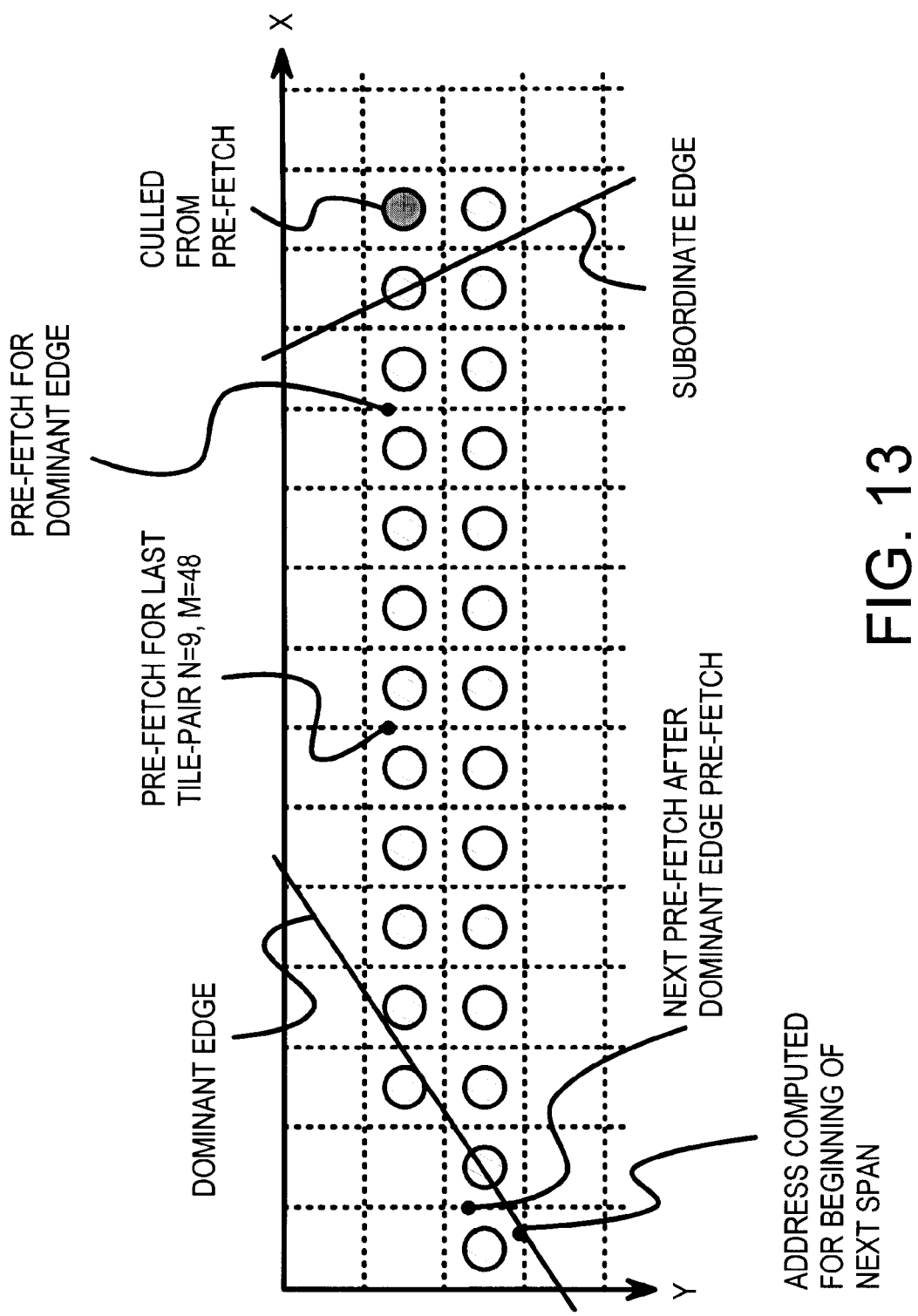
FIG. 13 illustrates the shifting of prefetch from along the same span to along a dominant edge and next span of a geometric shape in (u,v) space.

The dominant edge prefetch algorithm is very similar to the algorithm described earlier for along the span. In particular, there are likewise 2 address computation cycles. During the first cycle, instead of computing the addresses at (topu0,topv0) and (botu0,botv0) along the same span, the starting addresses are computed along the dominant edge as a function of derivatives maintained from previous dominant edge pixels. During the second cycle, the equations for Top17 (utop17, vtop17) and Bot17(ubot 17,vbot17) are governed by the derivatives maintained from the beginning of the previous span. Note that, although these will be correct only most of the time, at such time that the prefetch is incorrect, the logic generates a miss and the prefetch is re-aligned. As can be seen in FIG. 13, the Top0 and Bot0 addresses computed for the beginning of the new span are not necessarily aligned to the pixel tiles. Therefore, more blocks may be fetched than required for the 2-pixel-tiles. Nonetheless, no incorrect data is fetched and the logic resumes the tile-aligned prefetch during the next cycle.

Start-of-triangle Prefetch. At the start of a triangle rendering, there are no derivatives available for the normal prefetch computations. Before the first texel address reaches the Texture Cache, it is desired to prefetch one or more blocks so as to avoid a pipeline stall. It is possible to compute sufficient data in the Set-Up Engine so as to allow the logic to initiate a prefetch. In particular, the Set-Up Engine passes along the beginning LOD as well as the starting u,v address. In addition, it computes a bounding box for the entire triangle. This is based on the minimum and maximum u and v addresses for the 3 vertices. If the bounding box rectangle size exceeds the cache size limit of 32 blocks, the bounding box will represent the best-fit rectangle, up to 16 blocks, for the beginning of the triangle. The Set-Up Engine encodes the starting address and rectangle parameters into a 32 bit variable. It also sends a flag indicating that the prefetch may be turned-off for the entire triangle. In this manner, most triangles of less than 250 pixels and some larger ones will require no additional prefetch. In case a miss occurs subsequent to turning off prefetch, the prefetch shall be enabled. The rectangle encoding may consist of the 16-bit starting u,v block, the 4-bit start LOD, the 2-bit quadrant, the 5-bit RectCode and a 5-bit TrimCode. This encoding may then be multiplexed into the normal prefetch logic.

LOD Change Prediction. Thus far, the scheme assumes a constant LOD across the triangle. The LOD may, however, change at any pixel. Because the LOD change is infrequent, about 2.5% of all pixels, it may be unnecessary to optimize for this situation. In other words, the LOD change may simply cause a cache clear. In this case, the cache re-fill will cause a pipe halt. Because every halt may result in a loss of a dozen clock cycles, this miss-type may have a significant impact on performance. Therefore, it is worthwhile considering a solution. It is possible to devise a scheme that anticipates the LOD change and makes an additional prefetch for the anticipated LOD. The LOD, which is a 4.8 (4 integer and 8 fraction) value, may be derived for the next tiles in the same manner as the future addresses were derived, mainly by means of derivatives. By computing the LOD at the 4 corners of the 2-pixel-tile, it is reasonable to not only know which additional LOD is required, but to also calculate where the change will occur in the rectangle. From this data, it is then possible to initiate a second prefetch just before the current 2-pixel-tile rendering is complete and after the current LOD prefetch is complete. This means that half the cache is at one LOD and the other at the adjacent LOD. If the next prefetch bounding box anticipates no LOD change, as will be the case most of the time, then the normal cache operation is resumed. If, on the other hand, the LOD change continues, then this double and therefore slower prefetching continues.

Texture Cache Organization. The Texture Cache organization is determined from the access requirements described above. It consists of a 5-port SRAM organized in 32 locations of 256 bits each. One write port and 4 read ports are required. Although in theory not all read ports are required to read all the time—in fact most of the time only one or two reads are required—it is not very practical to take advantage of this statistical distribution. The write port may be accessed simultaneously with any or all reads. Subsequent to reading the 4 hexwords (256 bits) every cycle, 8 texels are selected from any combination of the read hexwords.

Address generation and Tag Table. Every clock, for each of the 2 texel addresses, 4 nearest neighbors must be retrieved in order to perform the texture filtering at a later stage. Therefore, each texel address has three 10-bit increment/decrement logic blocks. The fractional bits are unchanged. The eight resulting texel addresses are shifted according to the current LOD. The 16-bit (8 for u and 8 for v) block addresses for all 8 texels are subsequently presented to the Tag Table for validation. The 4-bit texel addresses (within the block) are forwarded to the Texture Cache output where they are used to select the corresponding texel values while the fractional bits are forwarded to the subsequent pipeline stage where they are used for filtering.

The Tag Table is a 32 entry by 16 bits per entry associative memory. The 16 bits represent the block addresses of the blocks presently in the Cache. Each entry has additionally a 1-bit valid flag. This bit is cleared for each location being replaced by blocks currently part of any pending memory fetch. Upon the writing of a new block, the valid bit is set. Each Tag Table cell is capable of comparing its current valid block address to the 8 texel block addresses, thus outputting 8 match bits. For each of the 8 texel blocks, the match bits from the 32 cells are gated to indicate whether the texel block is in the cache. If it is, then the corresponding 5-bit physical cache address is decoded and output along with the hit flag. Only 4 block addresses are possible per pixel pair because these are always adjacent pixels. Therefore, only the 4 common addresses are output.

If any address is not matched, the corresponding block must be updated by a miss cycle while the pipeline is stalled. During a pending prefetch, a miss (hit not true) generated from the Tag Table shall not result in a miss cycle until the prefetch is complete. In this case, the match compares shall continue every clock cycle until a hit is registered or the fetch is complete.

While the method of accessing textural bits in accordance with the invention has been described with respect to one Texture Cache embodiment and specific examples, the description is for illustrative purposes only. For example, different size and shape pixel tiles and bounding box rectangles may be advantageous when processing more pixels per clock as well as different texel bit resolutions. Thus, various modifications and applications may occur to those skilled in the art without departing from the true spirit and scope of the invention as defined by the appended claims.

What is claimed is:

1. In a three-dimensional graphics display system in which texture maps of an object are stored in memory for texels at (u,v) memory locations, a method of fetching texels for use in calculating (x,y) display pixel values comprising the steps of:
   a) identifying in (u,v) space a geometric shape to be displayed in (x,y) space,
   b) establishing tiles of pixels within the geometric shape for use in accessing texels,
   c) computing texel addresses at one side of a pixel-tile based on current addresses (topuc, topvc) and first and second derivatives of (u,v) as a function of (x) and a first derivative as a function of (y),
   d) computing texel addresses at an opposing side of the tile based on current addresses (u0,v0) and first and second derivatives of (u,v) as a function of (x) and a first derivative as a function of (y), and
   e) fetching texel blocks within the tiles as defined by the addresses in steps c) and d).

2. The method of claim 1 wherein in step a) the geometric shape is a triangle.

3. The method of claim 2 wherein a tile comprises a quadrilateral having top and bottom pixel locations for two opposing sides.

4. The method as defined by claim 3 wherein step c) and step d) define corners of the quadrilateral in (u,v) space.

5. The method of claim 4 wherein step e) fetches texel blocks of a texture tile within the quadrilateral while trimming out texel blocks of a texel tile not within the quadrilateral.

6. The method of claim 5 wherein step e) is halted when texel addresses are within a predetermined number of pixels from the end of a span within the geometric shape.

7. The method of claim 6 and further comprising invalidating all blocks in the texture cache when a last span of a triangle has been rendered but not invalidating all blocks in the texture cache when a new span in the triangle is begun, whereby the texture cache is not invalidated until the triangle is completed.

8. A texture cache system for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texture blocks from the graphics memory by the method defined by claim 7.

9. The texture cache system as defined by claim 8 wherein at the start of a geometric rendering a bounding box for the geometric shape to be displayed is computed in the texture space with a starting texel block and level-of-detail, as well as quadrant, rectcode and trimcode.

10. The texture cache system as defined by claim 8 and further including a tag table associative memory for addressing valid texel blocks in the texture cache.

11. The texture cache system as defined by claim 10 wherein the prefetch means includes look up tables for sparcing texel addressing.

12. The texture cache system as defined by claim 11 wherein the look up tables include a rectangle ratio table, a sector within a quadrant table, a trimcode table for excluded blocks, and a relative block address table responsive to the rectangle ratio, quadrant, and trimcode.

13. The method as defined by claim 1 wherein texture maps are provided for different levels of display (LOD) and wherein fetched texture blocks are invalidated when the LOD changes.

14. A texture cache for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texture blocks from the graphics memory by the method defined by claim 8.

15. The texture cache system as defined by claim 14 wherein at the start of a geometric rendering a bounding box for the geometric shape to be displayed is computed in the texture space with a starting texel block and level-of-detail, as well as quadrant, rectcode and trimcode.

16. The texture cache system as defined by claim 14 and further including a tag table associative memory for addressing valid texel blocks in the texture cache.

17. The texture cache system as defined by claim 16 wherein the prefetch means includes look up tables for sparcing texel addressing.

18. The texture cache system as defined by claim 17 wherein the look up tables include a rectangle ratio table, a sector within a quadrant table, a trimcode table for excluded blocks, and a relative block address table responsive to the rectangle ratio, quadrant, and trimcode.

19. A texture cache for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texel blocks from the graphics memory by the method defined by claim 1.

20. The texture cache system as defined by claim 19 wherein at the start of a geometric rendering a bounding box for the geometric shape to be displayed is computed in the texture space with a starting texel block and level-of-detail, as well as quadrant, rectcode and trimcode.

21. The texture cache system as defined by claim 19 and further including a tag table associative memory for addressing valid texel blocks in the texture cache.

22. The texture cache system as defined by claim 21 wherein the prefetch means includes look up tables for sparcing texel addressing.

23. The texture cache system as defined by claim 22 wherein the look up tables include a rectangle ratio table, a sector within a quadrant table, a trimcode table for excluded blocks, and a relative block address table responsive to the rectangle ratio, quadrant, and trimcode.

24. A texture cache for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texel blocks from the graphics memory by the method defined by claim 2.

25. The texture cache system as defined by claim 24 wherein at the start of a geometric rendering a bounding box for the geometric shape to be displayed is computed in the texture space with a starting texel block and level-of-detail, as well as quadrant, rectcode and trimcode.

26. The texture cache system as defined by claim 24 and further including a tag table associative memory for addressing valid texel blocks in the texture cache.

27. The texture cache system as defined by claim 26 wherein the prefetch means includes look up tables for sparcing texel addressing.

28. The texture cache system as defined by claim 27 wherein the look up tables include a rectangle ratio table, a sector within a quadrant table, a trimcode table for excluded blocks, and a relative block address table responsive to the rectangle ratio, quadrant, and trimcode.

29. A texture cache system for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texture blocks from the graphics memory by the method defined by claim 3.

30. The texture cache system as defined by claim 29 wherein at the start of a geometric rendering a bounding box for the geometric shape to be displayed is computed in the texture space with a starting texel block and level-of-detail, as well as quadrant, rectcode and trimcode.

31. The texture cache system as defined by claim 29 and further including a tag table associative memory for addressing valid texel blocks in the texture cache.

32. The texture cache system as defined by claim 31 wherein the prefetch means includes look up tables for sparcing texel addressing.

33. The texture cache system as defined by claim 32 wherein the look up tables include a rectangle ratio table, a sector within a quadrant table, a trimcode table for excluded blocks, and a relative block address table responsive to the rectangle ratio, quadrant, and trimcode.

34. A texture cache system for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texture blocks from the graphics memory by the method defined by claim 4.

35. The texture cache system as defined by claim 34 wherein at the start of a geometric rendering a bounding box for the geometric shape to be displayed is computed in the texture space with a starting texel block and level-of-detail, as well as quadrant, rectcode and trimcode.

36. The texture cache system as defined by claim 34 and further including a tag table associative memory for addressing valid texel blocks in the texture cache.

37. The texture cache system as defined by claim 36 wherein the prefetch means includes look up tables for sparcing texel addressing.

38. The texture cache system as defined by claim 37 wherein the look up tables include a rectangle ratio table, a sector within a quadrant table, a trimcode table for excluded blocks, and a relative block address table responsive to the rectangle ratio, quadrant, and trimcode.

39. A texture cache system for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texture blocks from the graphics memory by the method defined by claim 5.

40. The texture cache system as defined by claim 39 wherein at the start of a geometric rendering a bounding box for the geometric shape to be displayed is computed in the texture space with a starting texel block and level-of-detail, as well as quadrant, rectcode and trimcode.

41. The texture cache system as defined by claim 39 and further including a tag table associative memory for addressing valid texel blocks in the texture cache.

42. The texture cache system as defined by claim 41 wherein the prefetch means includes look up tables for sparcing texel addressing.

43. The texture cache system as defined by claim 42 wherein the look up tables include a rectangle ratio table, a sector within a quadrant table, a trimcode table for excluded blocks, and a relative block address table responsive to the rectangle ratio, quadrant, and trimcode.

44. A texture cache system for use in a three-dimensional graphics display system comprising a graphics memory containing texture maps, the texture maps containing different levels of display (LOD) of a texture, the texture maps containing a grid of texels, each containing texture attributes for a pixel;

a texture cache coupled to the graphics memory for storing a subset of the texels in the texture maps, the texture cache containing a plurality of blocks, each block containing a fixed size of texels for a texture map;

prefetch means coupled to the texture cache for prefetching new blocks of texels along a (u,v) vector, the (u,v) vector being a vector in a direction containing pixels for successive pixels along the span;

whereby the prefetch means accesses texture blocks from the graphics memory by the method defined by claim 6.

45. The texture cache system as defined by claim 44 wherein at the start of a geometric rendering a bounding box for the geometric shape to be displayed is computed in the texture space with a starting texel block and level-of-detail, as well as quadrant, rectcode and trimcode.

46. The texture cache system as defined by claim 44 and further including tag table associative memory for addressing valid texel blocks in the texture cache.

47. The texture cache system as defined by claim 46 wherein the prefetch means includes look up tables for sparcing texel addressing.

48. The texture cache system as defined by claim 47 wherein the look up tables include a rectangle ratio table, a sector within a quadrant table, a trimcode table for excluded blocks, and a relative block address table responsive to the rectangle ratio, quadrant, and trimcode.

* * * * *